United States Patent [19]
Meszaros

[11] 3,920,709
[45] Nov. 18, 1975

[54] ACYLATED ANTHRAQUINONE DYESTUFFS

[75] Inventor: Laszlo A. Meszaros, Charlotte, N.C.

[73] Assignee: Martin Marietta Corporation, Rockville, Md.

[22] Filed: Aug. 8, 1974

[21] Appl. No.: 495,674

Related U.S. Application Data

[63] Continuation-in-part of Ser. No. 306,898, Nov. 15, 1972, abandoned.

[52] U.S. Cl. .............................. 260/376; 8/39; 8/40; 260/381
[51] Int. Cl.² ........................................... C07C 49/68
[58] Field of Search .................................... 260/376

[56] References Cited
UNITED STATES PATENTS

| | | | |
|---|---|---|---|
| 1,710,995 | 4/1929 | Kränzlein et al. | 260/378 |
| 2,992,240 | 7/1961 | Lodge | 260/380 |
| 3,502,423 | 3/1970 | Buecheler | 260/380 |
| 3,687,985 | 8/1972 | Maier | 260/376 |
| 3,806,524 | 4/1974 | Kolliker et al. | 260/376 |
| 3,819,665 | 6/1974 | Bosshard et al. | 260/380 |

Primary Examiner—Arthur P. Demers
Attorney, Agent, or Firm—Wilton Rankin; John A. Crowley, Jr.

[57] ABSTRACT

Water-insoluble acylated anthraquinone dyestuffs of the formula

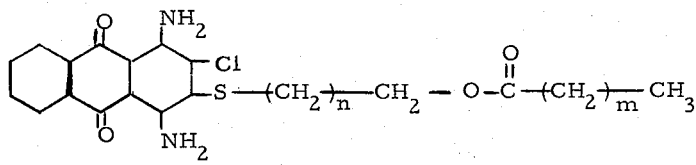

may be prepared by acylating an anthraquinone of the formula

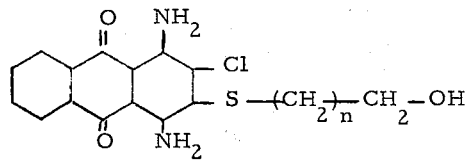

with an excess of an organic acid of the formula $CH_3(CH_2)_m COOH$ in the presence of a catalytic amount of sodium acetate, wherein n is 1 or 2 and m is 0, 1, 2 or 3. The resulting dyestuffs may be formed into aqueous dispersions, and the dispersions used to dye polyethylene terephthalate textile fibers bright royal blue shades having desirable fastness properties.

9 Claims, No Drawings

ACYLATED ANTHRAQUINONE DYESTUFFS

The present application is a continuation-in-part of my copending U.S. Pat. Application Ser. No. 306,898, filed Nov. 15, 1972, now abandoned, and benefit of the filing date that latter application is hereby claimed.

The present invention relates to water-insoluble acylated anthraquinone type dyestuffs.

The dyestuffs of the present invention may be described as anthraquinone dyestuffs of the formula

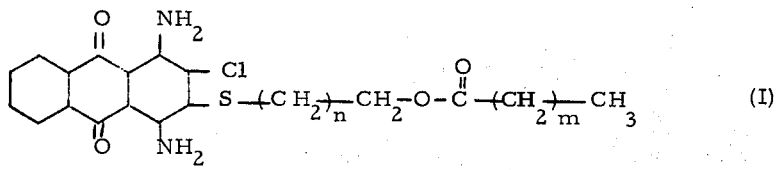

(I)

wherein $n$ is 1 or 2, and $m$ is 0, 1, 2, or 3.

Dyestuffs of Formula I above may be prepared by acylating an anthraquinone of the formula

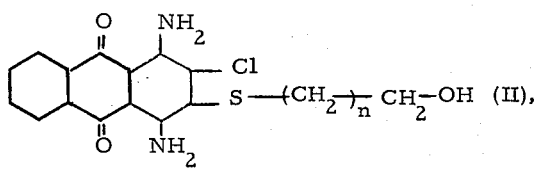

(II), which may be accomplished by heating an anthraquinone of Formula II above with an excess of an organic acid of the formula $CH_3(CH_2)_m COOH$ in the presence of a catalytic amount of sodium acetate, wherein $n$ is 1 or 2 and $m$ is 0, 1, 2 or 3.

The dyestuffs of Formula I above may be formed into aqueous dispersions thereof in conventional manner, and the dispersions used to dye polyethylene terephthalate textile fibers bright royal blue shades by the conventional thermosol or carrier dyeing methods. Polyethylene terephthalate textile fibers dyed with the dyestuffs of Formula I above have excellent wet crock fastness, excellent dry crock fastness, excellent fastness to dry cleaning, very good to excellent wash fastness, acceptable to good light fastness, and acceptable to very good sublimation fastness.

The dyestuffs of Formula I may also be used to dye cellulose acetate and nylon textile fibers royal blue shades by the conventional methods for dyeing those fibers.

The following is a more detailed description of the methods for making the dyestuffs of the present invention.

The anthraquinone compounds of Formula II above, which are used as starting materials in making the dyestuffs of the present invention, may be prepared as follows. 1,4-Diamino-2-chloro-3-(β-hydroxyethylthio)-anthraquinone may be prepared by heating at reflux for 8 hours 75 ml. water, 45 gms. 43% aqueous NaSH, 59 gms. ethanol, and 25.5 gms. 1,4-diamino-2,3-dichloroanthraquinone; cooling to 40°C.; adding 200 ml. cold water; adjusting temperature to 28°C.; adding 39 gms. 50% aqueous NaOH with stirring; cooling to 28°C.; adding 73 gms. ethylene chlorohydrin (2-chloro-ethanol) during 10-15 minutes, while stirring and maintaining 28° - 32°C. by adding ice and water as required; stirring at room temperature 5 hours; recovering the precipitate by filtration; washing it with cold water; and drying at 50°C. 1,4-Diamino-2-chloro-3-(gamma-hydroxypropylthio)-anthraquinone may be prepared by heating at reflux for 8 hours 75 ml. water, 24 gms. 43% aqueous NaSH, 59 gms. isopropyl alcohol, and 26 gms. 1,4-diamino-2,3-dichloroanthraquinone; cooling to 40°C.; adding 200 ml. cold water; adjusting temperature to 28°C.; adding 39 gms. 50% aqueous NaOH with stirring; cooling to 28°C.; adding 57.3 gms. 3-chloropropanol during 20 minutes, while stirring at 28°-32°C.; heating to 40°C. and maintaining at 40°-43°C. for 20 hours; recovering the precipitate by filtration; washing it with hot water; and drying at 45°C.

To prepare a compound of Formula I above, acylate a compound of Formula II above by heating a compound of Formula II with an excess of an organic acid of the formula $CH_3(CH_2)_m COOH$, wherein $m$ is 0, 1, 2 or 3, in the presence of a catalytic amount of sodium acetate, and by excess is meant that substantially more than 1 molecular proportion of the organic acid will be employed for each molecular proportion of the compound of Formula II employed. It will be convenient to heat the mixture of organic acid, sodium acetate and compound of Formula II above at about 110°–125°C. for about 8–24 hours to acylate the Formula II compound. At this stage, some of the product of Formula I will be in solution, and some will have precipitated. Cooling the mixture, and then stirring it with ice in water will improve the yield by precipitating more product of Formula I. The product of Formula I may be recovered by filtration, washed with water, and dried.

The following are illustrative examples of making the dyestuffs of the present invention. All parts and percentages herein are by weight, unless otherwise specified.

EXAMPLE 1

1,4-Diamino-2-chloro-3-(β-acetoxyethylthio)-anthraquinone may be prepared as follows.

Into a 3-neck 250 ml. flask equipped with stirrer and thermometer, charge 25 gms. dry 1,4-diamino-2-chloro-3-(β-hydroxyethylthio)-anthraquinone powder, 1 gm. sodium acetate and 80 gms. glacial acetic acid. Heat at 114°–115°C., with stirring, for 8 hours. Cool to room temperature; pour the flask contents onto 200 gms. ice in 350 gms. cold water, and stir 30 minutes. Recover the precipitated dyestuff by filtration; wash it with 6 liters cold water; and dry the dyestuff at 50°C.

EXAMPLE 2

1,4-Diamino-2-chloro-3-(β-propionyloxyethylthio)-anthraquinone may be prepared as follows.

This example is the same as Example 1 above, except that 100 gms. propionic acid is substituted for the acetic acid, and except that heating is at 122°C. for 23 hours.

EXAMPLE 3

1,4-Diamino-2-chloro-3-(β-butyryloxyethylthio)-anthraquinone may be prepared as follows.

This example is the same as Example 1 above, except that 100 gms. n-butyric acid is substituted for the acetic acid of Example 1, and except that the heating is at 120°–125°C. for 20 hours.

EXAMPLE 4

1,4-Diamino-2-chloro-3-(β-n-valeryloxyethylthio)-anthraquinone may be prepared as follows.

This example is the same as Example 1 above, except that 100 gms. n-valeric acid is substituted for the acetic acid of Example 1, and except that the heating is at 120°–125°C. for 24 hours.

EXAMPLE 5

1,4-Diamino-2-chloro-3-(gamma-acetoxypropylthio)-anthraquinone may be prepared as follows.

This example is the same as Example 1 above, except that 1,4-diamino-2-chloro-3-(gamma-hydroxypropylthio)-anthraquinone is substituted for the 1,4-diamino-2-chloro-3-(β-hydroxyethylthio)-anthraquinone used in Example 1, except that the amount of acetic acid is increased to 100 gms., and except that the heating is for 20 hours.

EXAMPLE 6

1,4-Diamino-2-chloro-3-(gamma-propionyloxypropylthio)-anthraquinone may be prepared as follows.

This example is the same as Example 1 above, except that 1,4-diamino-2-chloro-3-(gamma-hydroxypropylthio)-anthraquinone is substituted for the 1,4-diamino-2-chloro-3-(β-hydroxyethylthio)-anthraquinone used in Example 1, except that 100 gms. propionic acid is substituted for the acetic acid used in Example 1, and except that the heating is at 120°–125°C. for 20 hours.

EXAMPLE 7

1,4-Diamino-2-chloro-3-(gamma-n-butyryloxypropylthio)-anthraquinone may be prepared as follows.

Charge 25 gms. dry 1,4-diamino-2-chloro-3-(gamma-hydroxy-propylthio)-anthraquinone powder, 1 gm. sodium acetate and 100 gms. n-butyric acid into a 3-neck 250 ml. flask equipped with stirrer and thermometer. Heat at 118°–120°C., with stirring, for 9 hours. Cool to room temperature. Pour the flask contents onto 200 gms. ice in 350 ml. cold water. Add, with stirring, enough aqueous NaOH to the ice and water mixture to render it neutral; and stir 30 minutes. Recover the precipitated dyestuff by filtration; wash it with 6 liters cold water; and dry the dyestuff at 50°C.

EXAMPLE 8

1,4-Diamino-2-chloro-3-(gamma-n-valeryloxypropylthio)-anthraquinone may be prepared as follows.

This example is the same as Example 7 above, except that 100 gms. n-valeric acid is substituted for the n-butyric acid used in Example 7.

The following examples relate to dispersing the dyestuffs of the present invention, applying the dispersions to polyethylene terephthalate textile fibers, and testing the resulting dyeings.

EXAMPLE A

A 10% aqueous dispersion of the dyestuff of Example 1 above is prepared by charging 10 parts of the dried dye of Example 1, 10 parts sodium lignosulfonate, 10 parts glycerine and 40 parts water into a ball mill; ball milling the composition until the particles are substantially uniform and average 1–2 microns; and adding enough water to bring the final volume to 100 parts.

EXAMPLE B

A pale shade dyeing on polyethylene terephthalate textile yarn, using the dyestuff of Example 1, is made as follows.

Mix 0.15 gm. of the 10% dye dispersion of Example A above, 0.75 gm. emulsified o-phenylphenol carrier, 0.1 gm. Igepon T51 (N-methyl-N-oleoyl taurate) anionic detergent, 0.1 gm. Triton X-100 wetting agent (alkyl aryl polyether alcohol) and 0.1 gm. sodium hexametaphosphate with 300 gms. water. Adjust to pH 5–5.5 with monosodium phosphate and acetic acid. Enter 10 gms. polyethylene terephthalate textile yarn into the resulting dyebath. Bring the dyebath to the boil while agitating the yarn, and continue agitating the yarn in the dyebath at the boil for 1 hour. Remove the yarn; rinse it with water; scour the yarn 20 minutes at 75°C. in 300 ml. water containing 0.1 gm. Triton X-100 wetting agent (alkyl aryl polyether alcohol) and 0.2 gm. tetra-sodium pyrophosphate; rinse the yarn with water; dry the yarn at 250°F.; and heat the yarn at 340°F. for 2–3 minutes to remove residual carrier.

The resulting dyeing is royal blue. It has excellent wash fastness to AATCC Wash Test No. 3, with Pattern 5 and Stain 5 on nylon, viscose rayon, cellulose acetate, cotton, silk, wool and polyester; good light fastness with slight break after 40 hours in the Fade-Ometer carbon arc light fastness tester; and good sublimation fastness with Stain 4 after heating 30 seconds at 400°F. in the Scorch Tester sublimation fastness testing machine.

EXAMPLE C

A heavy shade dyeing on polyethylene terephthalate textile yarn, using the dyestuff of Example 1, is made as follows.

The dyeing is made in the same manner as the dyeing of Example B above, except that the amount of 10% dye dispersion is increased to 0.6 gm.

The resulting royal blue dyeing has very good wash fastness to AATCC Wash Test No. 3, with Pattern 5 and Stain 4-5 on cellulose acetate and nylon and Stain 5 on viscose rayon, silk, wool, cotton and polyester; good light fastness with slight break after 40 hours in the carbon arc light fastness tester; and acceptable sublimation fastness with Stain 3 after heating 30 seconds at 400°F. in the Scorch Tester machine.

EXAMPLE D

A pale shade dyeing is made on texturized double knit polyethylene terephthalate textile fabric, using the dye of Example 1, as follows.

The dyeing is made in the same manner as the dyeing of Example B above, except that 10 gms. of the fabric is used instead of yarn, emulsified o-phenylphenol carrier is omitted, the dyeing is made under pressure at 250°F., and final heating at 340°F. for 2-3 minutes is omitted.

The resulting dyeing is royal blue, and has excellent wet and dry crock fastness, good light fastness with trace break after 20 hours and slight break after 40 hours in the carbon arc light fastness tester, very good sublimation fastness with Stain 4–5 after 30 seconds at 350°F. in the Scorch Tester sublimation fastness testing machine, and very good wash fastness to AATCC Wash Test No. 3 with Pattern 5, and Stain 4–5 on nylon and acetate and Stain 5 on silk, cotton, viscose rayon, wool and polyester.

EXAMPLES E–K

Seven separate pale shades dyeings, using individually the dyes of Examples 2–8 above, were made as follows on polyethylene terephthalate textile yarn. Each yarn portion was dyed with only one dyestuff.

Mix 0.75 gms. emulsified o-phenylphenol carrier, 0.1 gm. Igepon T51 (sodium N-methyl-N-oleoyl taurate) anionic detergent, 0.1 gm. Triton X-100 wetting agent (alkyl aryl polyether alcohol) and 0.1 gm. sodium hexametaphosphate in 300 gms. water. Enter 10 gms. polyethylene terephthalate textile yarn. Add thereto a dispersion consisting of 15 mg. of one selected dye from Examples 2–8 above, 25 ml. dimethyl formamide and 2 ml. 10% aqueous sodium lignosulfonate. Adjust to pH 5–5.5 with monosodium phosphate and acetic acid. Heat to the boil, while agitating; heat at the boil, while agitating for 1 hour. Remove the yarn; rinse the yarn with cold water; scour the yarn 20 minutes at 75°C. in a solution containing 0.1 gm. Triton X-100 wetting agent (alkyl aryl polyether alcohol) and 0.2 gms. tetrasodium pyrophosphate in 300 ml. water; rinse the yarn with water; dry the yarn at 250°F.; and heat the yarn 2–3 minutes at 340°F.

The seven resulting dyeings are royal blue.

Each of the seven dyeings was tested for light fastness by placing it in the Fade-Ometer light fastness tester for 20 hours, and tested for sublimation fastness by heating it in the Scorch Tester sublimation fastness testing machine for 30 seconds at 400°F. The test results appear in the chart below.

EXAMPLES L–R

Seven separate heavy shades royal blue dyeings were made on polyethylene terephthalate textile yarn, using individually the dyes of Examples 2–8 above, as follows.

The dyeings were made in the same manner as the dyeings of Examples E–K above, except that the amount of dyestuff in each dyebath was increased from 15 mg. to 60 mg.

The resulting dyeings were tested in the same manner as the dyeings of Examples E–K above, and the test results appear in the following chart.

Numerical readings herein are on the Grey Scale, on which 5 is optimum.

| Dyestuff | Pale Shade Light Fastness | Pale Shade Sublimation Fastness | Heavy Shade Light Fastness | Heavy Shade Sublimation Fastness |
|---|---|---|---|---|
| Ex. 2 | Acceptable, Trace break. | Good, Stain 4. | Acceptable, Trace break. | Acceptable, Stain 2–3. |
| Ex. 3 | Acceptable, Slight break. | Very good, Stain 4-5. | Acceptable, Slight break. | Acceptable, Stain 3. |
| Ex. 4 | Do. | Do. | Do. | Do. |
| Ex. 5 | Acceptable, Trace break. | Good, Stain 4. | Acceptable, Trace break. | Acceptable, Stain 3. |
| Ex. 6 | Do. | Do. | Do. | Do. |
| Ex. 7 | Do. | Do. | Do. | Do. |
| Ex. 8 | Acceptable, Slight break. | Do. | Acceptable, Slight break. | Do. |

What is claimed is:

1. A compound of the formula

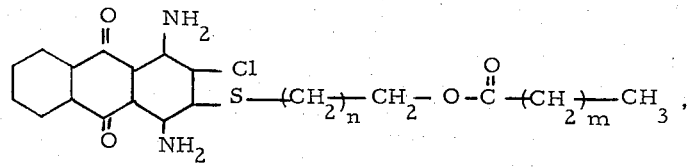

wherein $n$ is 1 or 2, and $m$ is 0, 1, 2 or 3.

2. 1,4-diamino-2-chloro-3-($\beta$-acetoxyethylthio)-anthraquinone.

3. 1,4-diamino-2-chloro-3-($\beta$-propionyloxyethylthio)-anthraquinone.

4. 1,4-diamino-2-chloro-3-($\beta$-n-butyryloxyethylthio)-anthraquinone.

5. 1,4-diamino-2-chloro-3-($\beta$-n-valeryloxyethylthio)-anthraquinone.

6. 1,4-diamino-2-chloro-3-(gamma-acetoxypropylthio)-anthraquinone.

7. 1,4-diamino-2-chloro-3-(gamma-propionyloxypropylthio)-anthraquinone.

8. 1,4-diamino-2-chloro-3-(gamma-n-butyryloxypropylthio)-anthraquinone.

9. 1,4-diamino-2-chloro-3-(gamma-n-valeryloxypropylthio)-anthraquinone.

* * * * *